United States Patent

[11] 3,615,772

| [72] | Inventor | Jaroslaw Kohut |
| | | Parma Heights, Ohio |
| [21] | Appl. No. | 819,473 |
| [22] | Filed | Apr. 25, 1969 |
| [45] | Patented | Oct. 26, 1971 |
| [73] | Assignee | Owens-Illinois, Inc. |
| | | Toledo, Ohio |

[54] FLUORINE-CONTAINING BORATE GLASS COMPOSITIONS
6 Claims, No Drawings

| [52] | U.S. Cl. | 106/54, 106/48 |
| [51] | Int. Cl. | C03c 3/04 |
| [50] | Field of Search | 106/54, 39, 47, 48 |

[56] References Cited
UNITED STATES PATENTS

| 3,000,745 | 9/1961 | Cianchi | 106/39 |
| 3,290,535 | 12/1966 | Hirayama | 106/54 X |
| 3,312,556 | 4/1967 | Oikawa et al. | 106/54 |
| 3,379,942 | 4/1968 | Davis | 106/54 X |
| 3,392,312 | 7/1968 | Carman | 106/54 X |

*Primary Examiner*—Tobias E. Levow
*Assistant Examiner*—W. R. Satterfield
*Attorneys*—Donald K. Wedding and Edward J. Holler ABSTRACT: There is disclosed fluorine-containing glass compositions which are lead-free and which have utility as sealing glasses, especially for iron-sealing applications, and which are useful as a frit. The glasses generally have the following compositions in percent by weight: about 5–11 percent $SiO$ ; about 37–53 percent $BO$ ; about 5–12 percent $ZnO$; about 2–5 percent $AlO$ ; about 4–18 percent $NaO$; about 2–6 percent $KO$; about 2–13 percent $LiO$; about 3–6 percent $CaO$; about 3–6 percent $BaO$; and fluorine in an amount not to exceed about 3.5 percent.

FLUORINE-CONTAINING BORATE GLASS COMPOSITIONS

THE INVENTION

This invention relates to glass compositions and, more particularly, to lead-free glass compositions having relatively low softening temperatures. The glasses of this invention have their major utility as sealing glasses and especially as sealing glasses for iron. They may also be employed as a frit in which electroluminescent phosphors may be suspended and applied onto a suitable electrode for purposes of forming an electroluminescent phosphors may be suspended and applied onto a suitable electrode for purposes of forming an electroluminescent phosphor-bearing enamel.

Heretofore, glasses which have been suitable for the above purposes typically contain substantial amounts of lead oxide. It is generally known that the manufacture of these prior art lead-bearing glasses are subject to certain major deficiencies. One of these deficiencies is the fact that the cost of lead-containing batch material is relatively expensive and, therefore, these glasses become somewhat uneconomical for substantial commercial usage. In addition to the high raw material costs, the cost of producing lead-bearing glass is increased still further because of the corrosion and/or erosion of the furnace refractories during the melting operation. Additionally, the conditions under which melting of a lead-bearing glass takes place must be well controlled. That is, the lead-bearing glass must be melted under a controlled oxidizing atmosphere. Similarly, when lead glasses are used for sealing applications, it is generally important that the atmosphere under which the sealing is done, also be a controlled oxidizing atmosphere. Another deficiency of employing and manufacturing lead-bearing glasses resides in the fact that lead compounds are highly toxic and therefore undesirable to use. When used, glasses containing lead must be melted with special precautions due to the toxicity of the lead compounds.

Those skilled in the art readily appreciate the need for glass compositions which do not possess the hereinbefore stated deficiencies of the prior art lead glasses.

It is, therefore, an object of this invention to provide glass compositions which can be economically produced.

It is another object of this invention to provide glass compositions which may be melted without the need for controlling the atmosphere under which the glass is melted.

It is another object to provide substantially transparent glass compositions which have linear coefficients of thermal expansion in the range of about $110 \times 10^{17}$ to $120 \times 10^{17}$ centimeters per centimeter per degree C. over a temperature range of about 0° C. to 300° C.

Yet another object is to provide a lead-free glass.

Still another object of this invention is to provide for glasses which have relatively low softening temperatures, that is, preferably a softening temperature of less than about 510° C. and, most desirably, softening temperatures of less than about 480° C.

Yet another object of this invention is to provide for a substantially transparent sealing glass.

Still another object of this invention is to provide sealing glasses for making glass-to-metal seals, wherein the sealing operation may be done under either oxidizing or reducing conditions.

The foregoing objects and other advantageous features of this invention are advantageously obtained by employing glass compositions having the following constituents in percent by weight: $SiO_2$—about 5–11; $B_2O_3$—about 37–53; ZnO—about 5–12; $Al_2O_3$—about 2–5; $Na_2O$—about 4–18; $K_2O$—about 2–6; $Li_2O$—about 2–13; CaO—about 3–6; BaO—about 3–6; and fluorine in percent by weight not to exceed about 3.50. Preferably, the glass compositions of this invention will contain the following constituents in parts by weight: $SiO_2$—about 6.0–10.0; $B_2O_3$—about 49–50; ZnO—about 7–10.1; $Al_2O_3$—about 2.6–4.8; $Na_2O$—about 6–14.1; $K_2O$—about 2.2–5.4; $Li_2O$—about 2.8–11.5; CaO—about 4–5; BaO—about 4–5; and fluorine in percent by weight not to exceed about 3.50. Most desirably, the glass will have the following approximate compositions in percent by weight: $SiO_2$—6–7; $Al_2O_3$—2.6–2.9; $Na_2O$—6–14.1; $K_2O$—2.2–5.4; CaO—4.6–4.9; BaO—4.6–4.9; $B_2O_3$—49–50; $Li_2O$—3.2–11.5; ZnO—7–10.1; and fluorine in percent by weight not to exceed about 3.50.

The raw materials which are employed to manufacture the foregoing glasses of this invention are those typically used in the commercial production of various glass compositions. That is, the raw materials include sand, sodium silica fluoride, alumina, soda ash, potash, lime, barium carbonate, boric acid, lithium carbonate and zinc oxide.

Table I, hereinafter, represents glass batch ingredients in parts by weight which may be employed to produce the advantageous glass compositions of this invention. It will, of course, be apparent that these compositions are merely exemplary of applicant's invention and are in no way to be construed as limiting the scope of this invention.

TABLE I

| Material | A | B | C | D |
| --- | --- | --- | --- | --- |
| Sand | 410 | 233 | 233 | 233 |
| Sodium Silica Fluoride | 208 | 292 | 292 | 292 |
| Alumina | 237 | 137 | 137 | 137 |
| Soda Ash | 796 | 1,044 | 436 | 355 |
| Potash | 355 | 392 | 318 | 171 |
| Lime | 430 | 430 | 430 | 430 |
| Barium Carbonate | 310 | | 310 | 310 |
| Boric Acid | 4,417 | 4,417 | 4,417 | 4,417 |
| Lithium Carbonate | 358 | 420 | 1,420 | 1,420 |
| Zinc Oxide | 353 | 353 | 353 | 504 |

The final glass may be prepared from the foregoing batch compositions in any conventional manner. That is, the batch ingredients are first admixed and then melted in a suitable melting furnace. Thus, the batch compositions of this invention were first admixed and placed in suitable crucibles; the batch-containing crucible was then positioned in an electrically fired furnace and heated to about 2,400° F. for about 8 hours to obtain a homogeneous melt. According to techniques well known to those skilled in the art, the melted glass was then cooled and pulverized to produce a particulate glass suitable for use as a sealing glass. If desired, the batch may also be melted in a gas-fired furnace and, as pointed out above, there will be no need to control the redox state of the not gases.

The glasses resulting from the melting of the above batches have the compositions set forth in table II, in percent by weight, if calculated from the respective batches on the customary theoretical oxide basis. It will be understood, however, that the fluorine remaining in the glass is most likely combined as the fluoride of one or more of the cationic constituents of the glass and, most likely, issues in the form of sodium fluoride. The fluorine contents in table II are recited in the usual manner as being additional to the compositions of the base glasses and represent the maximum percent by weight of fluorine which could be present if no fluorine were lost in the melting. The properties stated in table II were measured on actual samples of the respectively formed glass compositions.

TABLE II

COMPOSITIONS IN PERCENT BY WEIGHT

| % Oxide | A | B | C | D |
| --- | --- | --- | --- | --- |
| $SiO_2$ | 9.55 | 6.55 | 6.55 | 6.55 |
| $Al_2O_3$ | 4.74 | 2.74 | 2.74 | 2.74 |
| $Na_2O$ | 10.61 | 14.04 | 7.04 | 6.04 |
| $K_2O$ | 4.81 | 5.31 | 4.31 | 2.31 |
| CaO | 4.75 | 4.75 | 4.75 | 4.75 |
| BaO | 4.75 | 4.75 | 4.75 | 4.75 |
| $B_2O_3$ | 49.47 | 49.47 | 49.48 | 49.47 |
| $Li_2O$ | 2.86 | 3.36 | 11.36 | 11.36 |

| | | | | |
|---|---|---|---|---|
| ZnO | 7.01 | 7.01 | 7.01 | 10.01 |
| Fluorine | 2.50 | 3.50 | 3.50 | 3.50 |
| Fiber Softening Point °C. | 510 | 478 | 453 | 468 |
| Annealing Point °C. | | 384 | 367 | 381 |
| Strain Point °C. | | 358 | 345 | 358 |
| Expansion ×to $10^{17}$ cm./cm./°C. (0° C – 300° C.) | | 117 | 118 | 110 |
| Density gm./cc. | | 2.6112 | | |

In general, the glass compositions formed in accordance with this invention will be advantageously relatively low-softening temperature glasses. That is, they will have softening temperatures below about 510° C.; preferably, the softening temperature of the glasses will be below about 480° C. and most desirably will have softening points in the range of about 440° C. to about 480° C. As used herein, the term "softening point," or "softening temperature," means that temperature at which a uniform fiber, 0.5 to 1.0 mm. in diameter and 22.9 cm. in length elongates under its own weight at a rate of 1 mm. per minute when the upper 10 cm. of its length is heated. For glasses of this invention, the softening point or temperature generally corresponds to that temperature at which the base 10 logarithm of viscosity is about 7.65. Additionally, these glass compositions will most desirably have coefficients of thermal expansion, when measured over a range of about 0° C. to 300° C., of about 110 to 120×$10^{17}$ cm./cm./° C. Those skilled in the art will immediately recognize that these features of the inventive glass compositions make the glasses well adapted for use in making glass-to-metal seals, especially glass-to-iron seals. Additionally, as was surprisingly found by applicant, the inventive glasses disclosed herein will be clear, notwithstanding the relatively high-fluorine contents. Normally, as will be readily apparent to those skilled in the art, glasses having fluorine contents comparable to those disclosed herein are milky or opallike in appearance.

Since, in the analysis of fluorine containing glass compositions, it is standard practice to determine the cationic constituents of a glass, which are reported on an oxide basis, and then to determine the amount of fluorine present, which is reported as fluorine along with the oxygen equivalent thereof, a fluorine containing glass may be looked upon as a glass having a base composition and a fluorine content. The base composition, or the base glass, of course, is that composition which is ascertained by determining the quantity of the various cationic constituents of the glass and reporting them on an oxide basis; it being understood, of course, that portions of some of the cations exist, however, in the form of fluorides and not as oxides.

The fluorine content of the glasses of this invention will advantageously be about at least 0.75 percent by weight. Table III below represents, in addition to the fluorine content, base glass compositions of this invention on a theoretically calculated oxide basis. Column A represents glass compositions suitable for obtaining glasses having the hereinbefore described desirable features, while Column B represents preferred compositions. Most desirably, glasses will have the composition set forth in Column C.

TABLE III

| Constituent (% by Weight) | A | B | C |
|---|---|---|---|
| $SiO_2$ | 5–11 | 6–10 | 6–7 |
| $B_2O_3$ | 37–53 | 49–50 | 49–50 |
| ZnO | 5–12 | 7–10.1 | 7–10.1 |
| $Al_2O_3$ | 2–5 | 2.6–4.8 | 2.6–2.9 |
| $Na_2O$ | 4–18 | 6–14.1 | 6–14.1 |
| $K_2O$ | 2–6 | 2.2–5.4 | 2.2–5.4 |
| $Li_2O$ | 2–13 | 2.8–11.5 | 3.2–11.5' |
| CaO | 3–6 | 4–5 | 4.6–4.9 |
| BaO | 3–6 | 4–5 | 4.6–4.9 |

As pointed out above, the base glasses of table III will also contain fluorine in an amount not to exceed about 3.5 percent by weight and preferably will include at least about 0.75 percent by weight.

Having thus described my invention and having set forth the best mode contemplated in practicing the invention,

I claim:

1. A lead-free, fluorine-containing glass having a softening temperature of between about 440° C. and about 480° C. and a linear thermal expansion coefficient in the range of about 110×$10^{17}$ to 120×$10^{17}$ cm/cm/° C. consisting of between about 0.75 to about 3.5 weight percent fluorine and a base glass, said base glass consisting essentially of the following range of constituents in percent by weight: about 6–7% $SiO_2$, about 49–50% $B_2O_3$, about 7–10.1% ZnO, about 2.6–2.9% $Al_2O_3$, about 6–14.1% $Na_2O$, about 2.2–5.4% $K_2O$, about 3.2–11.5% $Li_2O$, about 4.6–4.9% CaO, and about 4.6–4.9% BaO.

2. A clear, lead-free, fluorine-containing glass consisting essentially of the following constituents on a theoretical oxide basis in percent by weight: about 6–10% $SiO_2$, about 49–50% $B_2O_3$, about 7–10.1% ZnO, about 2.6–4.8% $Al_2O_3$, about 6–14.1% $Na_2O$, about 2.2–5.4% $K_2O$, about 2.8–11.5% $Li_2O$, about 4–5% CaO, and about 4–5% BaO, said glass having a softening point of less than about 510° C. and a fluorine content of between about 0.75 to about 3.5 weight percent.

3. The glass of claim 2 wherein said softening point is between about 440° C. and 510° C. and wherein said glass has a linear coefficient of thermal expansion between about 110 to about 120×$10^{17}$.

4. A clear, relatively low-softening temperature, lead-free sealing glass consisting essentially of the following constituents in percent by weight: about 5–11% $SiO_2$, about 37–53% $B_2O_3$, about 5–12% ZnO, about 2–5% $Al_2O_3$, about 4–18% $Na_2O$, about 2–6% $K_2O$, about 2–13% $Li_2O$, about 3–6% CaO, about 3–6% BaO, and fluorine in an amount between about 0.75 percent to about 3.5 percent by weight, said glass having a thermal expansion coefficient between about 110 to 120×$10^{17}$ cm/cm/° C.

5. A lead-free glass forming composition consisting essentially of the following glass forming constituents in percent by weight based on the glass forming constituents of said compositions: about 5–11% $SiO_2$, about 37–53% $B_2O_3$, about 5–12% ZnO, about 2–5% $Al_2O_3$, about 4–18% $Na_2O$, about 2–6% $K_2O$, about 2–13% $Li_2O$, about 3–6% CaO, about 3–6% BaO, and fluorine in an amount between about 0.75 to about 3.5 percent.

6. The glass of claim 5 wherein fluorine is present in an amount of at least about 2.5 percent by weight.

* * * * *

PO-1050
(5/69)

UNITED STATES PATENT OFFICE
CERTIFICATE OF CORRECTION

Patent No. 3,615,772    Dated October 26, 1971

Inventor(s) Jaroslaw Kohut

It is certified that error appears in the above-identified patent and that said Letters Patent are hereby corrected as shown below:

In the ABSTRACT, line 6, "SiO" should be --$SiO_2$--; in the ABSTRACT, line 6, "BO" should be --$B_2O_3$--; in the ABSTRACT, line 7, "AlO" should be --$Al_2O_3$--; in the ABSTRACT, line 7, "NaO" should be --$Na_2O$--; in the ABSTRACT, line 8, "KO" should be --$K_2O$--in the ABSTRACT, line 8, "LiO" should be --$Li_2O$--. Column 1, line 47, "110 x $10^{17}$" should be --110 x $10^{-7}$--; column 1, line 47, "110 x $10^{17}$" should be --110 x $10^{-7}$--. Column 2, TABLE 1, line 29, "Barium Carbonate    310        310    310" should read -- Barium Carbonate    310    310    310    310--; line 47, "not" should be --hot--. Column 2, TABLE II, line 73, "BaO    4.75    4.75    4.75    4.75" should be -- BaO    4.75    4.75    4.76    4.75--; Column 3, line 7, "$10^{-17}$" should be --$10^{-7}$--Column 3, line 29, "120 x $10^{17}$" should be --120 x $10^{-7}$--. Column 4, line 24, "110 x $10^{17}$ to 120 x $10^{17}$" should be --110 x $10^{-7}$ to 120 x $10^{-7}$--; Column 4, line 42, "120 x $10^{17}$" should read --120 x $10^{-7}$--; Column 4, lines 50 and 51, "110 to 120 x $10^{17}$" should be --110 to 120 x $10^{-7}$--

Signed and sealed this 9th day of May 1972.

(SEAL)
Attest:

EDWARD M. FLETCHER, JR.
Attesting Officer

ROBERT GOTTSCHALK
Commissioner of Patents